United States Patent
Zeitoun et al.

(10) Patent No.: US 9,309,129 B1
(45) Date of Patent: Apr. 12, 2016

(54) MULTI-EFFECTS DESALINATION SYSTEM

(71) Applicant: KING SAUD UNIVERSITY, Riyadh (SA)

(72) Inventors: Obida Mohamed Zeitoun, Riyadh (SA); Hany Abdelrahman Alansary, Riyadh (SA); Abdullah Othman Nuhait, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/667,626

(22) Filed: Mar. 24, 2015

(51) Int. Cl.
  *B01D 1/26* (2006.01)
  *C02F 1/04* (2006.01)
  *B01D 1/28* (2006.01)
  *C02F 103/08* (2006.01)

(52) U.S. Cl.
  CPC ... *C02F 1/04* (2013.01); *B01D 1/26* (2013.01); *B01D 1/28* (2013.01); *C02F 2103/08* (2013.01)

(58) Field of Classification Search
  CPC ......... C02F 1/04; C02F 2103/08; B01D 1/26; B01D 1/28
  See application file for complete search history.

(56) References Cited

U.S. PATENT DOCUMENTS

| | | | | |
|---|---|---|---|---|
| 3,351,120 A | * | 11/1967 | Goeldner et al. | 159/13.3 |
| 3,713,989 A | * | 1/1973 | Bom | 202/173 |
| 3,844,899 A | * | 10/1974 | Sager, Jr. | 202/173 |
| 3,941,663 A | * | 3/1976 | Steinbruchel | 202/174 |
| 4,046,637 A | * | 9/1977 | Sasaki | 202/174 |
| 4,330,373 A | * | 5/1982 | Liu | 202/174 |
| 4,376,679 A | * | 3/1983 | Liu | 203/71 |
| 5,139,620 A | * | 8/1992 | Elmore et al. | 203/11 |
| 7,799,178 B2 | | 9/2010 | Eddington | |
| 7,922,874 B2 | | 4/2011 | Ophir et al. | |
| 9,028,653 B2 | * | 5/2015 | Kwak et al. | 202/174 |
| 2010/0078306 A1 | * | 4/2010 | Alhazmy | 203/10 |
| 2014/0263081 A1 | * | 9/2014 | Thiers | 210/718 |

FOREIGN PATENT DOCUMENTS

| | | |
|---|---|---|
| CN | 101475231 A | 7/2009 |
| CN | 202016925 U | 10/2011 |
| CN | 102502903 A | 6/2012 |
| CN | 102992532 A | 3/2013 |
| CN | 102557168 B | 10/2013 |
| WO | WO 2005/100252 A1 | 10/2005 |

* cited by examiner

*Primary Examiner* — Renee E Robinson
*Assistant Examiner* — Jonathan Miller
(74) *Attorney, Agent, or Firm* — Richard C. Litman

(57) ABSTRACT

A multi-effects desalination system includes a housing having a heating box, a plurality of vessels, a plurality of heat rods within each of the vessels, and a condenser unit. Each vessel is separated by a separator wall. Each heat rod extends through one of the separator walls, such that each heat rod has a first end extending into one vessel and a second end extending into an adjacent vessel. The desalination system also includes a plurality of sprayers, a plurality of demisters, and a plurality of trays. Each sprayer is configured to discharge feed water FW onto the second end of each heat rod in a respective vessel and each tray being configured to collect condensate or fresh water. The condensate collected in one to tray can be transferred to the condensate collection tray in an adjacent vessel. Further, the desalination system can also include a thermocompressor unit.

7 Claims, 11 Drawing Sheets

MULTI-EFFECTS DESALINATION SYSTEM

BACKGROUND OF THE INVENTION

1. Field of the Invention

The present invention relates generally to desalination systems and, more particularly, to a modified multi-effect distillation thermal vapor compression (MED-TVC) desalination system having a plurality of heat rods.

2. Description of the Related Art

Multiple-effect distillation with thermal vapor compression (MED-TVC) is a process used for sea water desalination. Typically, the MED-TVC systems produce desalinated (distillate) water from seawater (salt water), through a multi-stage system which includes horizontal tube bundles at each stage. In each stage, feed water is heated and partially evaporated by the vapor condensing inside the tubes. Saline water evaporates in one stage, and the vapor flows into the tubes of a subsequent stage. Each stage reuses energy from a previous stage. However, the vapor velocity inside the evaporator tubes drops dramatically as it condenses along evaporator tubes. Also, the two phase pressure loss caused by vapor condensing inside the evaporator tubes is high, leading to considerable temperature loss and increase in evaporator heating surface area.

Thus, a multi-effects desalination system solving the aforementioned problems is desired.

SUMMARY OF THE INVENTION

A multi-effects desalination system includes a housing having a heating box, a plurality of vessels, a plurality of heat rods within each of the vessels, and a condenser unit. Each vessel is separated by a separator wall. Each heat rod extends through one of the separator walls, such that each heat rod has a first end extending into one vessel and a second end extending into an adjacent vessel. The desalination system also includes a plurality of sprayers and a plurality of demisters. Each sprayer is configured to discharge feed water into a respective one of the vessels, e.g., onto the second end of each heat rod in a respective vessel. Each of a plurality of trays, including a first tray, a second tray, a third tray, a fourth tray, and a fifth tray, are positioned underneath the first ends of the heat rods for collecting condensate or fresh water. The condensate collected in one tray can be transferred to the condensate collection tray in an adjacent vessel. Further, the desalination system can also include a thermocompressor unit arranged in communicating relation with a steam source.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
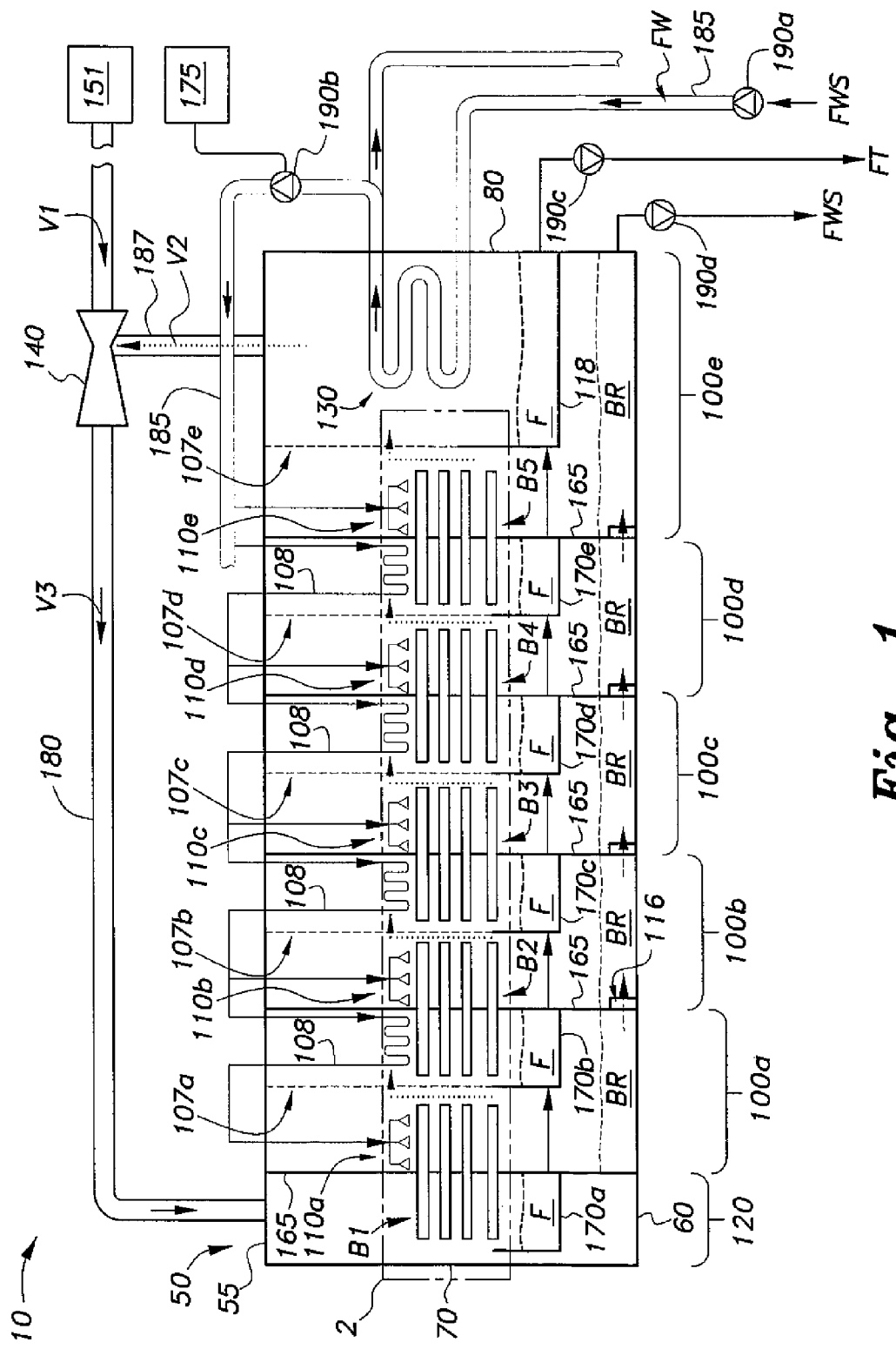
FIG. 1 is a schematic diagram of an embodiment of a desalination system having a plurality of effects according to the present invention.
Figure 2:
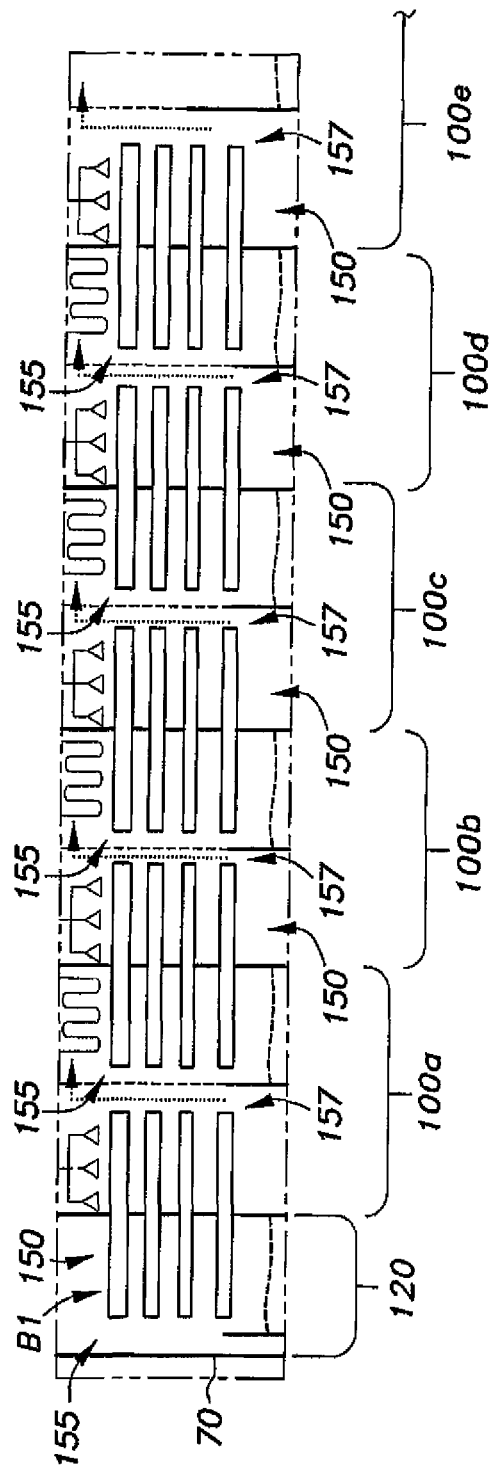
FIG. 2 is a schematic diagram of a portion of the desalination system shown in FIG. 1, showing the ends of the plurality heat rods for the desalination system according to the present invention.
Figure 3A:
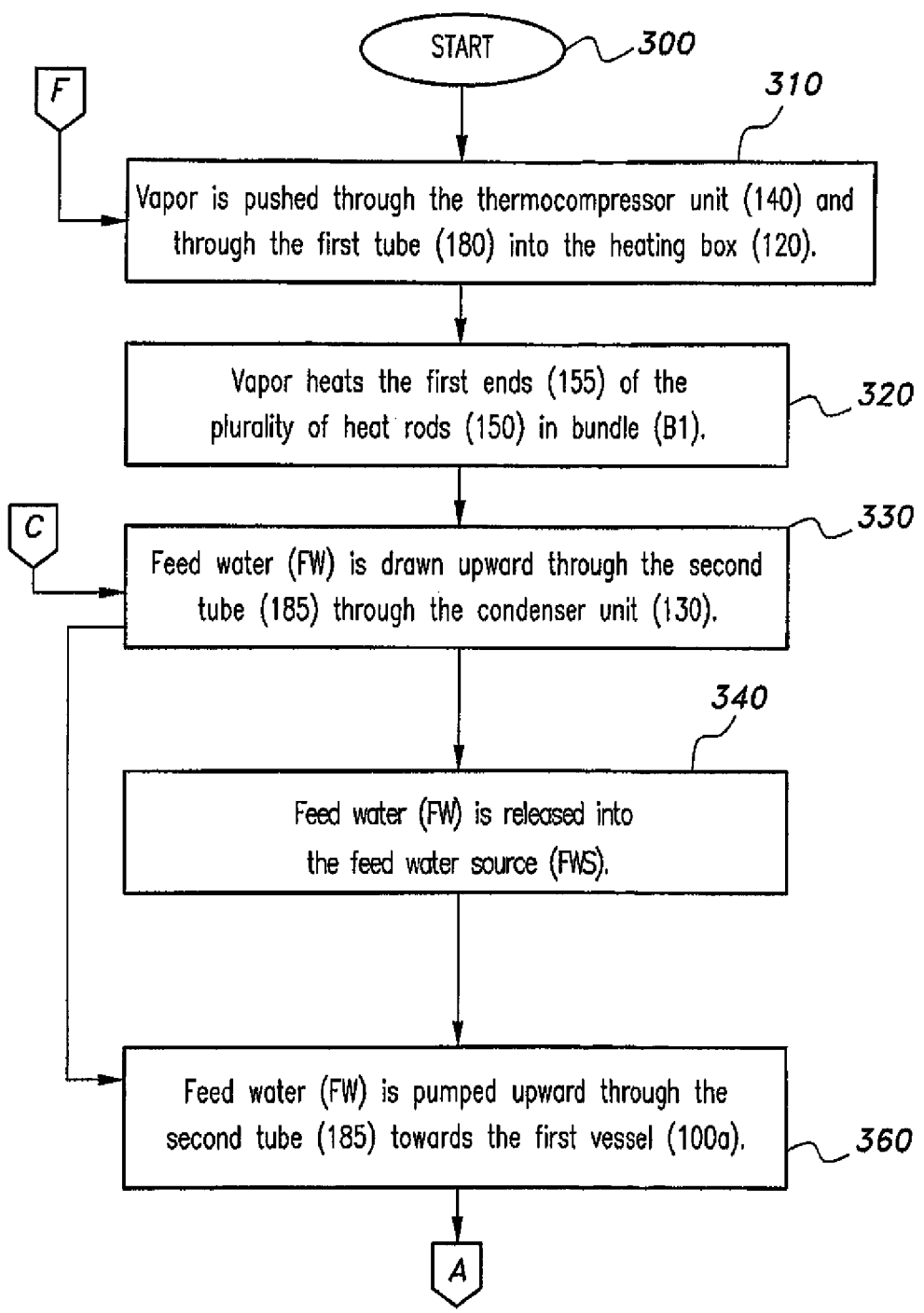
FIG. 3A a flowchart illustrating a method to desalinate seawater according to the present invention.
Figure 3B:
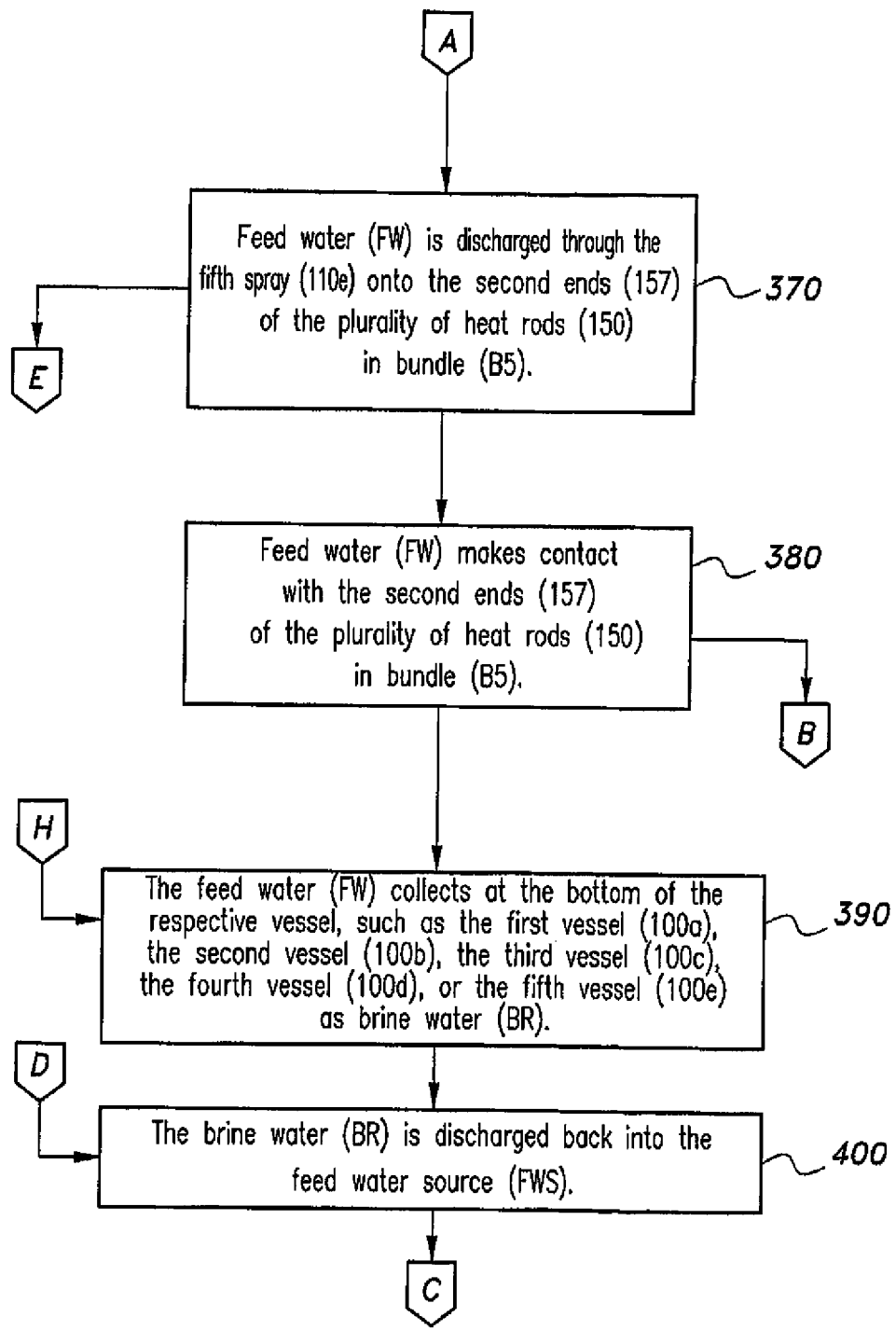
FIG. 3B a flowchart illustrating a method to desalinate seawater according to the present invention.
Figure 3C:
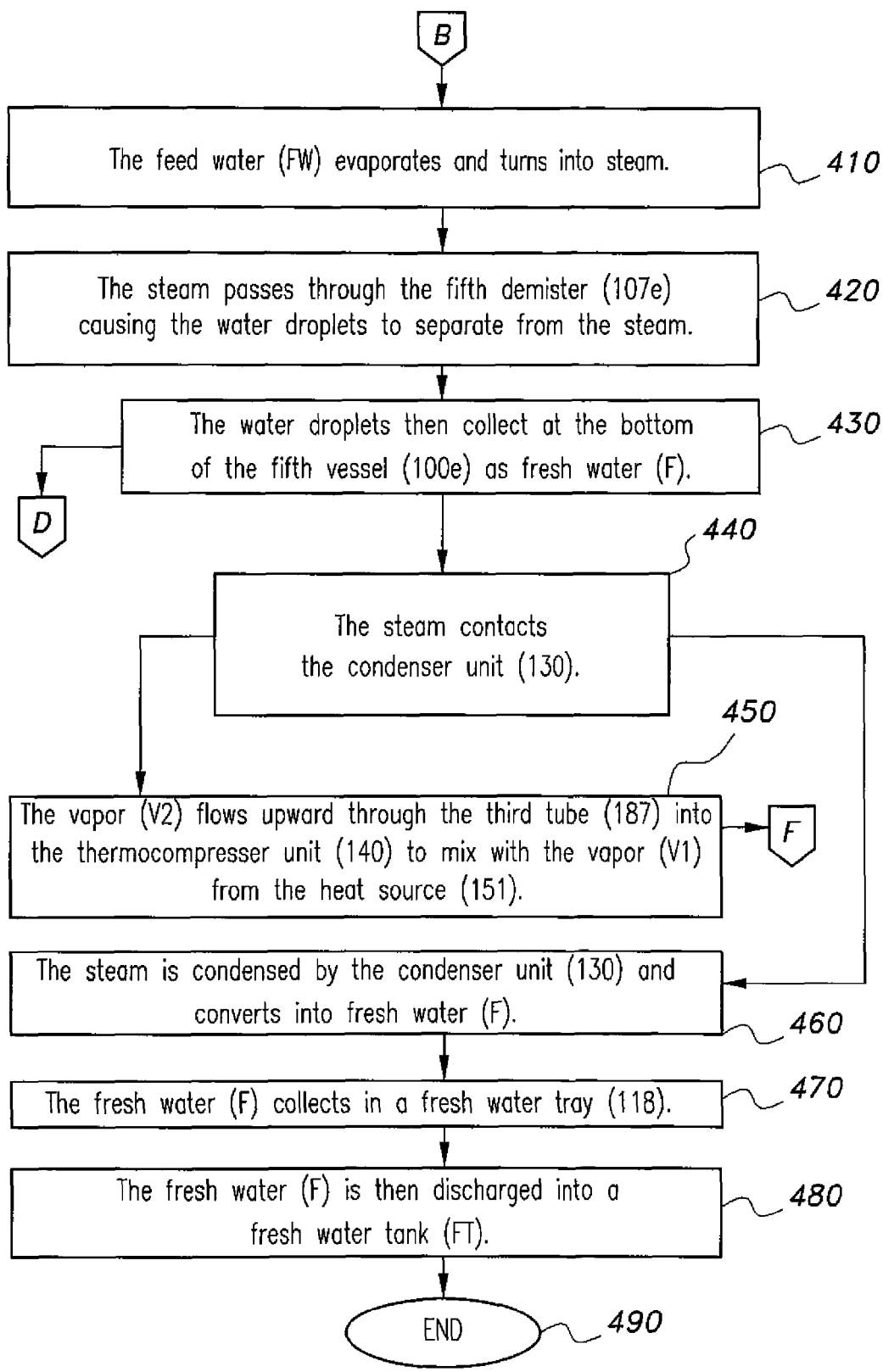
FIG. 3C a flowchart illustrating a method to desalinate seawater according to the present invention.
Figure 3D:
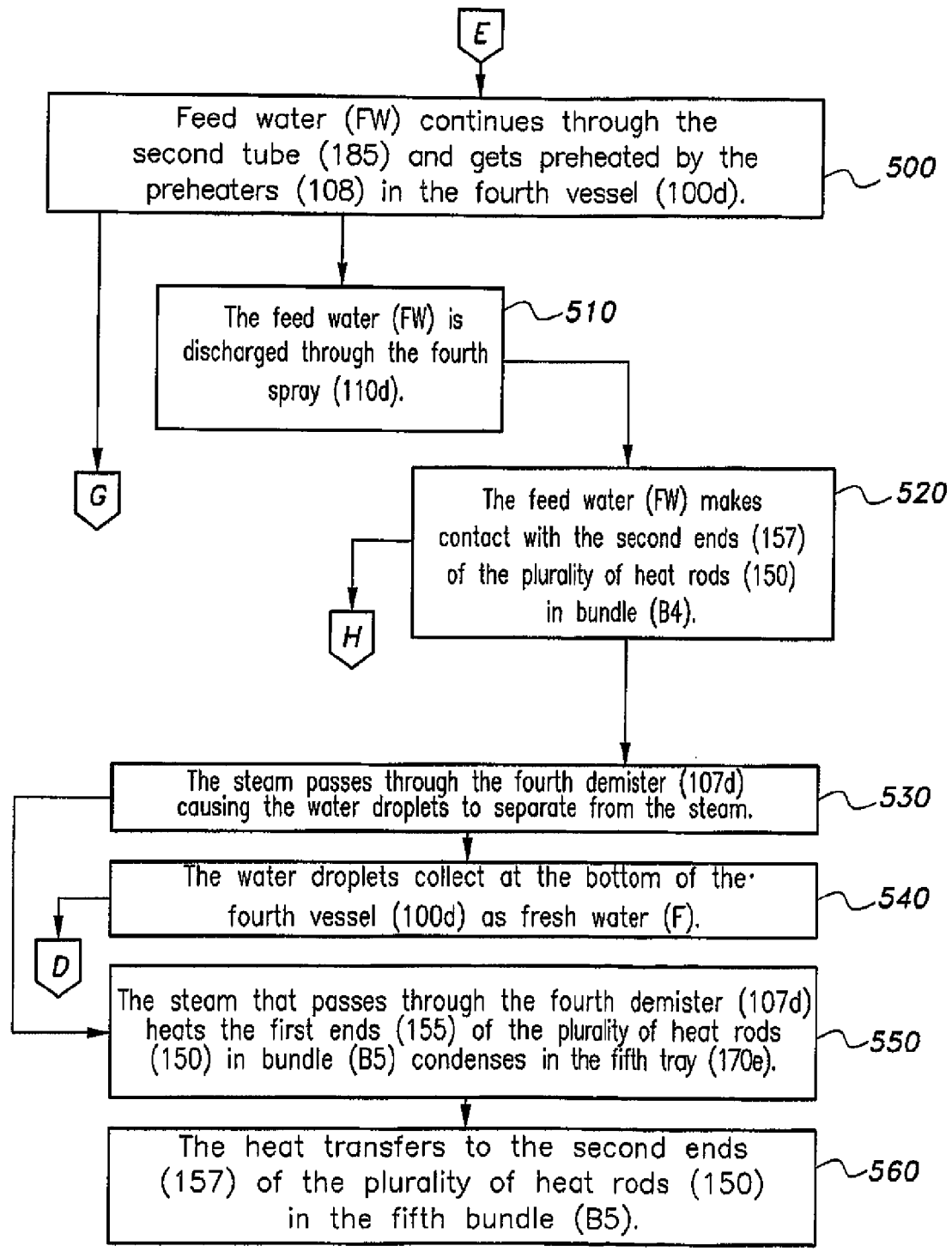
FIG. 3D a flowchart illustrating a method to desalinate seawater according to the present invention.
Figure 3E:
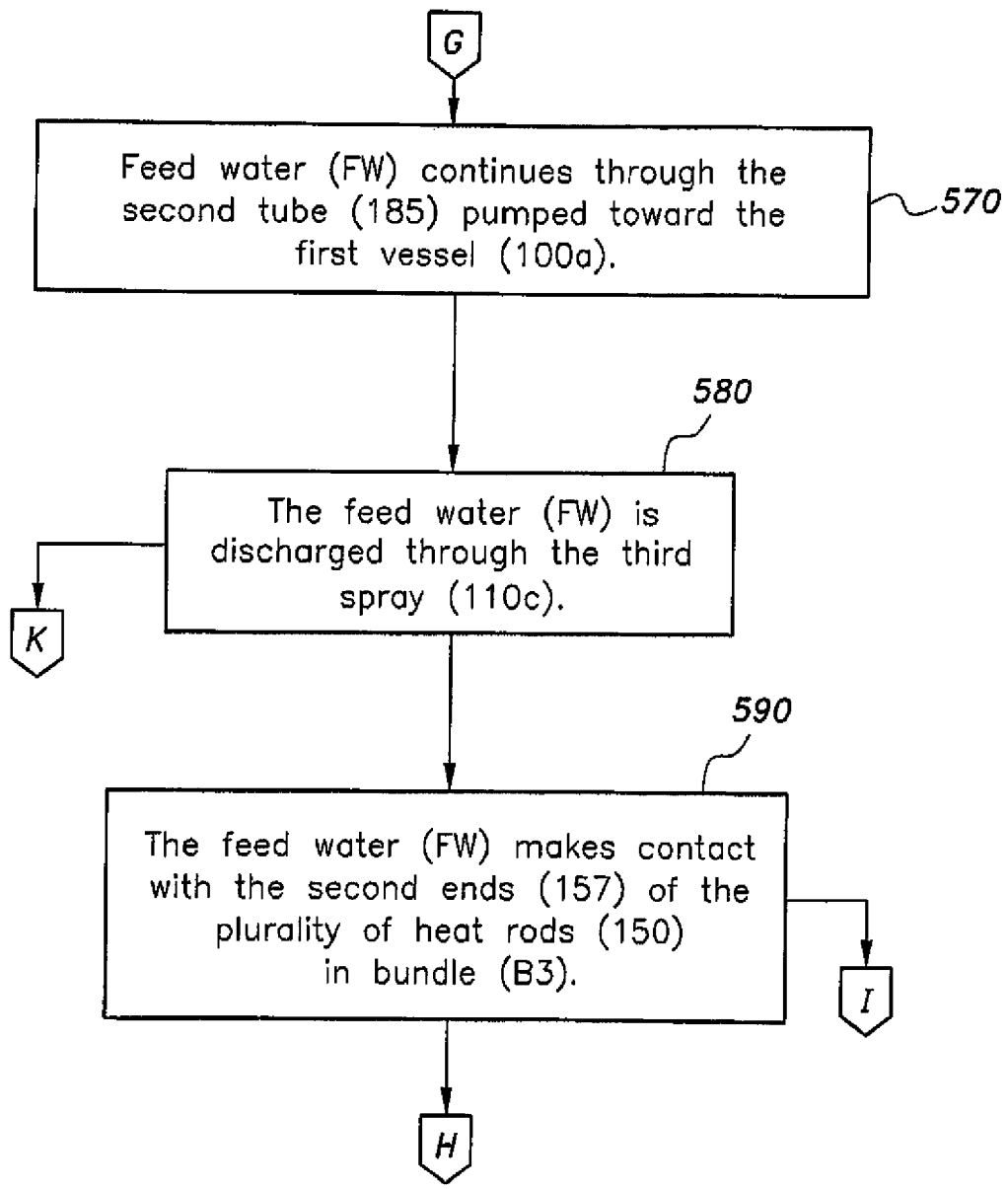
FIG. 3E a flowchart illustrating a method to desalinate seawater according to the present invention.
Figure 3F:
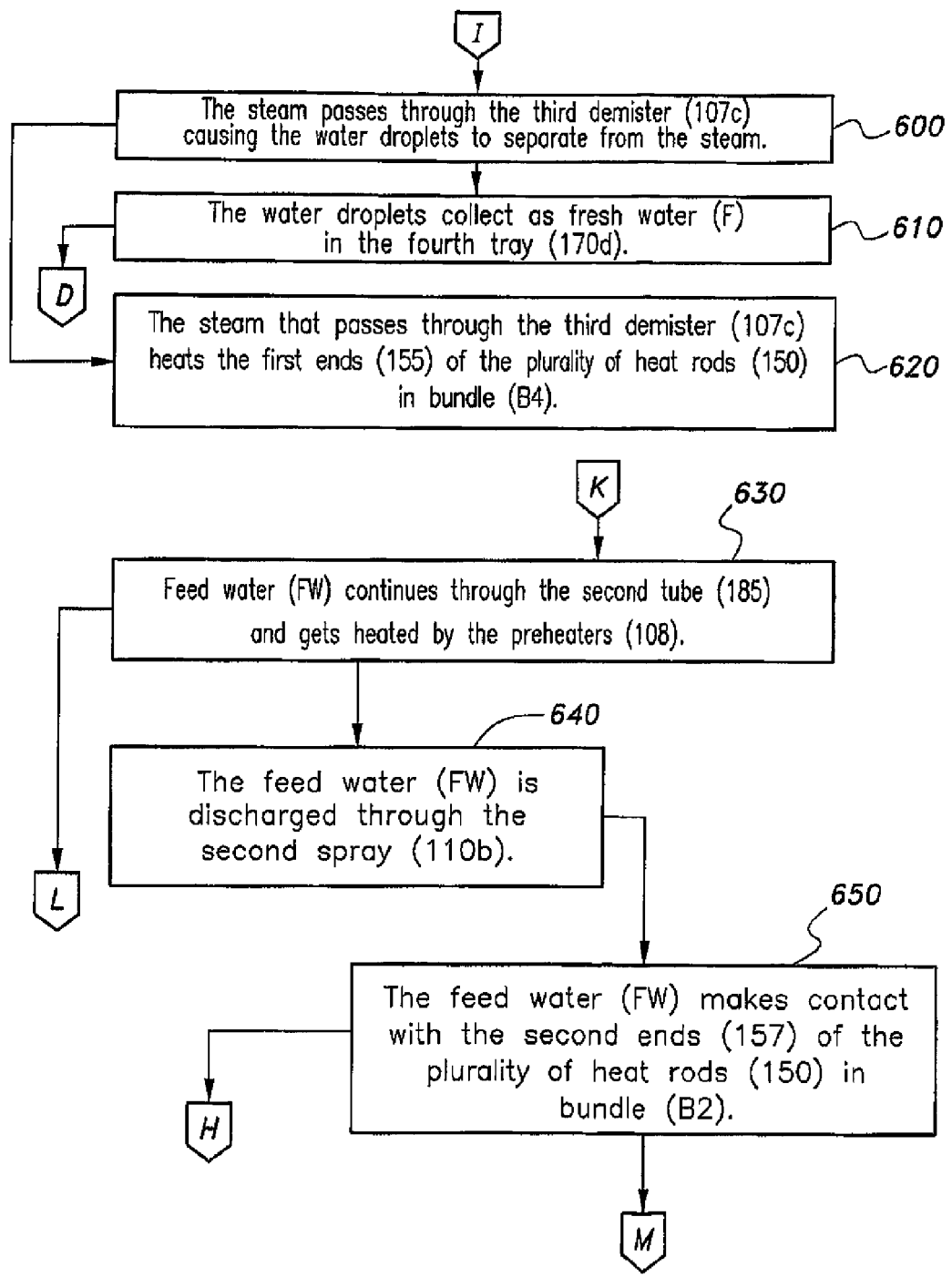
FIG. 3F a flowchart illustrating a method to desalinate seawater according to the present invention.
Figure 3G:
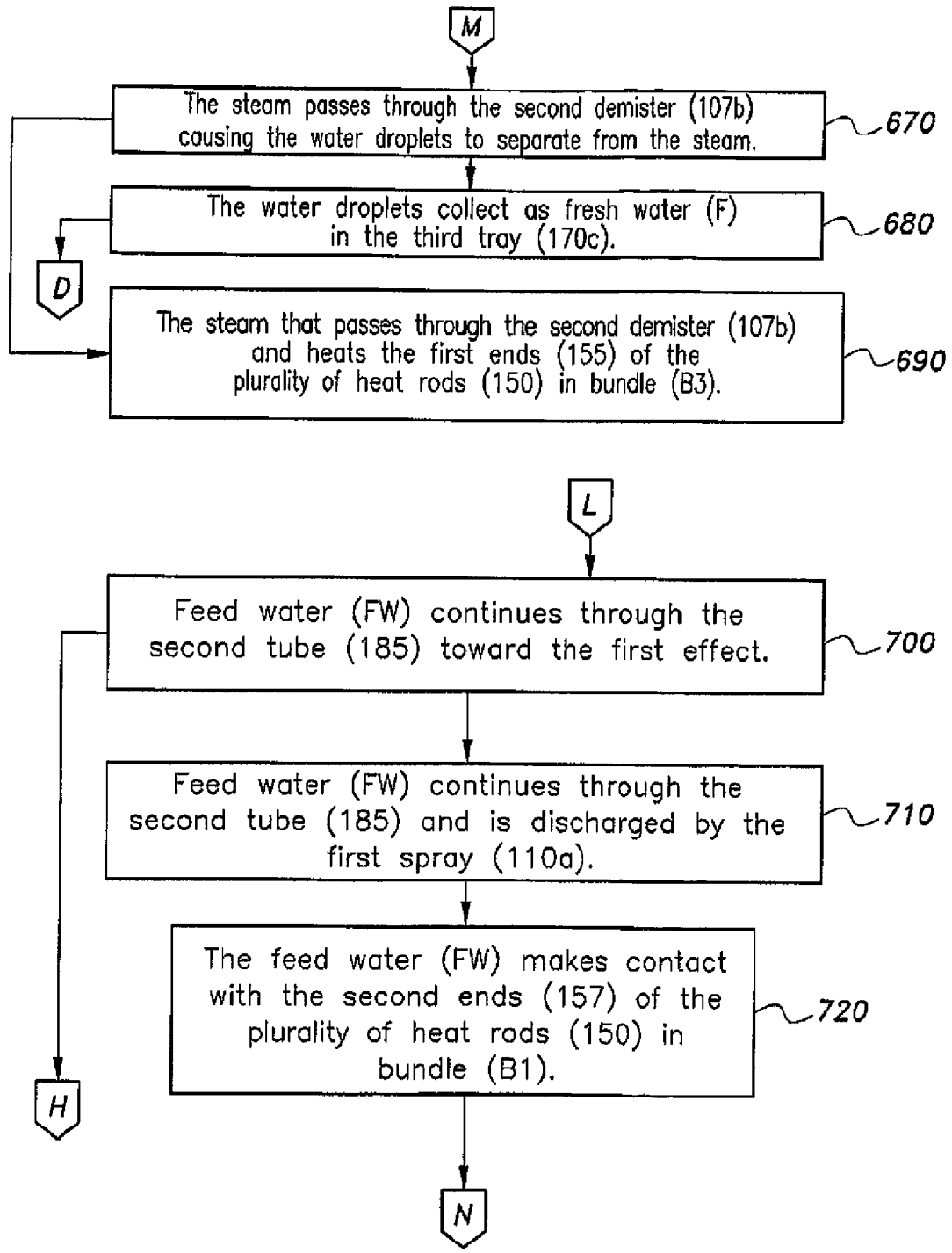
FIG. 3G a flowchart illustrating a method to desalinate seawater according to the present invention.
Figure 3H:
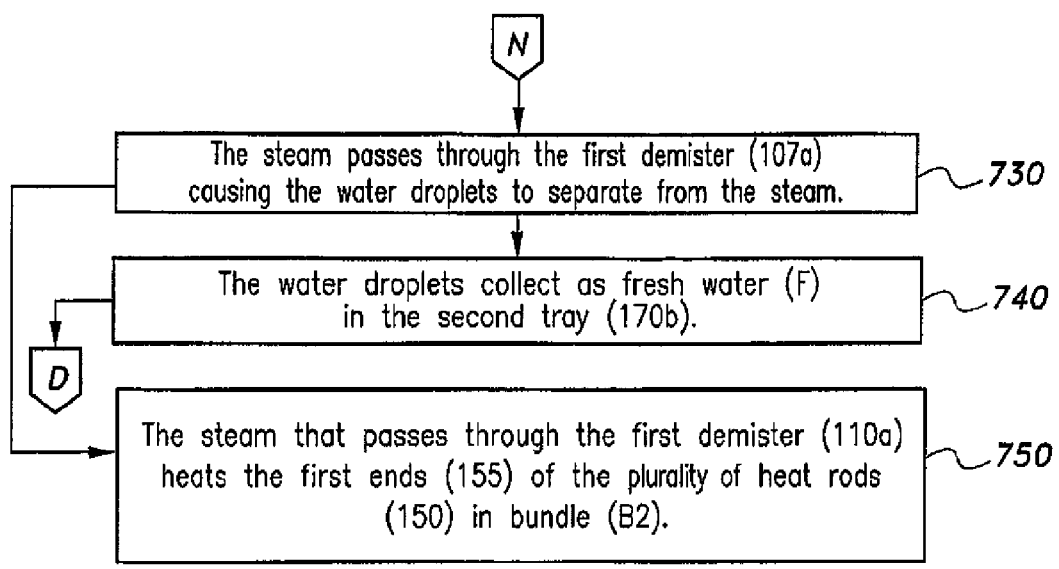
FIG. 3H a flowchart illustrating a method to desalinate seawater according to the present invention.

As shown in FIGS. 1 and 2, a multi-effects desalination system 10 includes a housing 50 having a heating box 120, a plurality of vessels, including a first vessel 100a, a second vessel 100b, a third vessel 100c, a fourth vessel 100d, and a fifth vessel 100e, a plurality of heat rods 150 within each of the vessels, and a condenser unit 130. Each vessel 100a-100e is separated by a separator wall 165. By separating each vessel 100a-100e with a separator wall 165, the desalination system 10 can reduce temperature loss and reduce the amount of pressure needed to desalinate feed water FW. Each heat rod 150 extends through one of the separator walls 165. Each heat rod 150 has a first end 155 extending into one vessel and a second end 157 extending into an adjacent vessel (FIG. 2). The desalination system 10 also includes a plurality of sprayers, including a first sprayer 110a, a second sprayer 110b, a third sprayer 110c, a fourth sprayer 110d, and a fifth sprayer 110e. Each sprayer is configured to discharge feed water FW in a respective one of the vessels. For example, each sprayer can discharge feed water FW, such as seawater, onto the second end 157 of each heat rod 150 in a respective vessel. Each of a plurality of trays, including a first tray 170a, a second tray 170b, a third tray 170c, a fourth tray 170d, and a fifth tray 170e, are positioned underneath the first ends 155 of the heat rods 150 for collecting condensate or fresh water (F). The condensate collected in one tray can be transferred to the condensate collection tray in an adjacent vessel through tubing extending between and connecting trays 170a-170e. Further, the desalination system 10 can optionally include a thermocompressor unit 140 arranged in communicating relation with a steam source 151.

The first vessel 100a, the second vessel 100b, the third vessel 100c, the fourth vessel 100d, and the fifth vessel 100e are each configured to accommodate a different effect or stage of desalination occurring in the system 10. The plurality of heat rods 150 can be arranged in any suitable configuration in the vessels. For example, a first bundle of heat rods B1, can include a first plurality of heat rods 150, with first ends 155 disposed in the heat box 120 and second ends 157 disposed in the first vessel 100a. A second bundle of heat rods B2, can include a second plurality of heat rods 150, with first ends 155 disposed in the first vessel 100a and second ends 157 disposed in the second vessel 100b. A third bundle of heat rods B3, can include a third plurality of heat rods 150, with first ends 155 disposed in the second vessel 100b and second ends 157 disposed in the third vessel 100c. A fourth bundle of heat rods B4, can include a fourth plurality of heat rods 150, with first ends 155 disposed in the third vessel 100c and second ends disposed in the fourth vessel 100d. A fifth bundle of heat rods B5, can include a fifth plurality of heat rods 150, with first ends 155 disposed in the fourth vessel 100d and second ends in the fifth vessel 100e.

The desalination system 10 further includes a plurality of demisters including a first demister 107a, second demister 107b, a third demister 107c, a fourth demister 107d, and a fifth demister 107e. The first demister 107a extends between the first bundle of heat rods B1 and the second bundle of heat rods B2. The second demister 107b extends between the second bundle of heat rods B2 and the third bundle of heat rods B3. The third demister 107c extends between the third bundle of heat rods B3 and the fourth bundle of heat rods B4. The fourth demister 107d extends between the fourth bundle of heat rods B4 and the fifth bundle of heat rods B5. A plurality of pumps 190a-190d are provided, including a first pump 190a configured for pumping feed water FW upward through a second tube 185 from a feed water source FWS, such as the ocean, a second pump 190b configured to pump the feed water FW through the second tube 185 toward the first vessel 100a, a third pump 190c configured to pump fresh water F from a fresh water tray 118 into a fresh water tank FT, and a fourth pump 190d configured for pumping brine water BR into the feed water source FWS.

The desalination system 10 can also include a power source 175, such as solar panels or wind turbines, coupled to the first pump 190a, the second pump 190b, the third pump 190c, and/or the fourth pump 190d to power the desalination system 10. The thermocompressor unit 140 receives a first vapor V1 from the steam source 151. The steam source can be a conventional boiler or any type of suitable steam boiler operating from a renewable energy source such as solar, geothermal, waste heat, or a biomass energy source. The first vapor V1 is used to extract a second vapor V2 from one or more vessels 100a-100e through a third tube 187 to create a total or combination vapor V3, which is fed into the heating box 120 through a first tube 180.

The first ends 155 of the plurality of heat rods 150 in bundle B1 are heated in the heating box 120. Heat is transferred from the first ends 155 to the second ends 157 of the heat rods 150 in bundle B1. The first spray 110a releases feed water FW onto the second ends 157 of the plurality of heat rods 150 in the first vessel 100a to generate steam. In other words, heat transferred from the first ends 155 to the second ends 157 partially evaporates the spray of water falling from the sprayer 110a. The vapor or steam produced in the first vessel 100a flows through the demister 107a. The demister 107a separates water droplets from the steam, which are collected in the second tray 170b. The remaining steam heats the first ends 155 of the second bundle B2 of heat rods 150. In this manner, the first ends 155 of the heat rods 150 of the second bundle B2 are heated. The steam flowing through the demister 107a also provides heat to the preheater tubes 108 in the first vessel 100a. The preheater tubes 108 can heat water that is fed into the first vessel 100a. Vapor is produced in the remaining vessels 100b-100d and transferred to an adjacent vessel in a similar fashion. The vapor formed in the last vessel 100e is forwarded to the condenser unit 130 through the demister 107e. The condenser unit 130 condenses the generated steam into fresh water F to be pumped into the fresh water tank FT at atmospheric pressure. As condensation occurs on outer surfaces of the pipes or tubes and not inner surfaces, pressure drop inside the tube and associated temperature loss are avoided.

It is contemplated that there can be "n" effects (stages) and "n" corresponding vessels in the desalination system 10, whereas "n" can be either greater than or less than five. It is to be noted that each of the plurality of (desirably five) effects (stages) occurs in a separate vessel. For example, the first effect can take place in the first vessel 100a, the second effect can take place in the second vessel 100b, the third effect can take place in the third vessel 100e, the fourth effect can take place in the fourth vessel 100d, and the fifth effect can take place in the fifth or last vessel 100e. Further, each effect (stage) can operate at a higher boiling temperature and pressure than the subsequent effect (stage).

The housing 50 can have a top portion 55, a bottom portion 60, a first side 70, and a second side 80. The housing 50 can be made from any suitable material, such as steel, configured to retain heat and collect the brine water BR. The plurality of vessels, such as the first vessel 100a, the second vessel 100b, the third vessel 100c, the fourth vessel 100d, and the fifth vessel 100e can have any suitable shape, such as a generally rectangular shape, and can be arranged in a horizontal configuration, as illustrated in FIG. 1. The separator wall 165 separating each vessel can include an opening 116, to allow the brine BR to flow and flash through the successive vessels, e.g., from the first vessel 100a through the second vessel 100b, the third vessel 100c, the fourth vessel 100d, and the fifth vessel 100e, so that the brine BR can be discharged into the feed water source FWS. Tubing connecting the first through fifth trays 170a-170e and the fresh water tray 118 can also extend through the separator walls 165.

The heating box 120 can be made from any suitable material, such as steel. The heating box 120 can have any suitable shape, such as a generally rectangular shape. The heating box 120 can house the first ends 155 of the plurality of heat rods 150 in bundle B1. Further, the condenser unit 130, configured to cool the steam received from the fifth vessel 100e, can be positioned in the fifth vessel 100e. The fifth vessel 100e can house the second ends 157 of the plurality of heat rods 150 in bundle B5, as illustrated in FIG. 1.

Each of the plurality of heat rods 150 can be formed from steel, or any suitable material that can absorb large amounts of heat, such as the heat from the vapor V3 emitted by the thermocompressor 140, and can have any suitable length and width sufficient to absorb the maximum amount of heat emitted by the thermocompressor unit 140. It is to be noted that the plurality of heating rods 150 can include a plurality of heating rods, heating pipes, or heat pipe systems. Each of the bundles B1, B2, B3, B4, and B5 can extend through a respective one of the separator walls 165, so that the heat received by the first ends 155 in one vessel can be transferred to the second ends 157 of the plurality of heat rods 150 in an adjacent vessel.

The first ends 155 of each heat rod 150 in bundle B1 can be positioned in the heating box 120 so as to receive the heat from the steam introduced by the thermocompressor unit 140 through the first tube 180. The first ends 155 transfer the heat to the corresponding second end 157 of each heat rod 150 in bundle B1 positioned in the first vessel 100a. When the second ends 157 receive the feed water FW from the first spray 110a, steam is created. The steam passes through the demister 107a and heats the first ends 155 of each heat rod 150 in bundle B2 that are housed in the first vessel 100a. The second ends 157 of the plurality of heat rods 150 in bundle B1 are separated from the first ends 155 of the plurality of heat rods 150 in bundle B2 by the first demister 107a.

The first ends 155 of each heat rod 150 in bundle B2 can be housed in the first vessel 100a and the corresponding second ends 157 of each heat rod 150 in bundle B2 can be housed in the second vessel 100b. The first ends 155 of each heat rod 150 in bundle B3 can be housed in the second vessel 100b and the corresponding second ends 157 of each heat rod 150 in bundle B3 can be housed in the third vessel 100c. The second ends 157 of the plurality of heat rods 150 in bundle B2 can be separated from the first ends 155 of the plurality of heat rods 150 in bundle B3 by the second demister 107b, as illustrated in FIG. 1. The number of effects will determine the number of bundles of heat rods in the desalination system 10, as well as the corresponding number of demisters.

Each sprayer 110a-110e can be positioned within a respective vessel 100a-100e over the second ends 157 of the plurality of heat rods 150 in a respective bundle B1, B2, B3, B4, and B5. Each of the plurality of sprayers 110a-110e can be arranged in communicating relation with the second tube 185, thereby receiving the feed water FW from the feed water source FWS. The sprayers, such as sprayers 100a-110c, can be any suitable type of sprayer, as is well known in the art, configured to discharge the feed water FW received from the feed water source FWS onto the second ends 155 of the plurality of heat rods 150 housed within each of the plurality of vessels.

Figure 4:
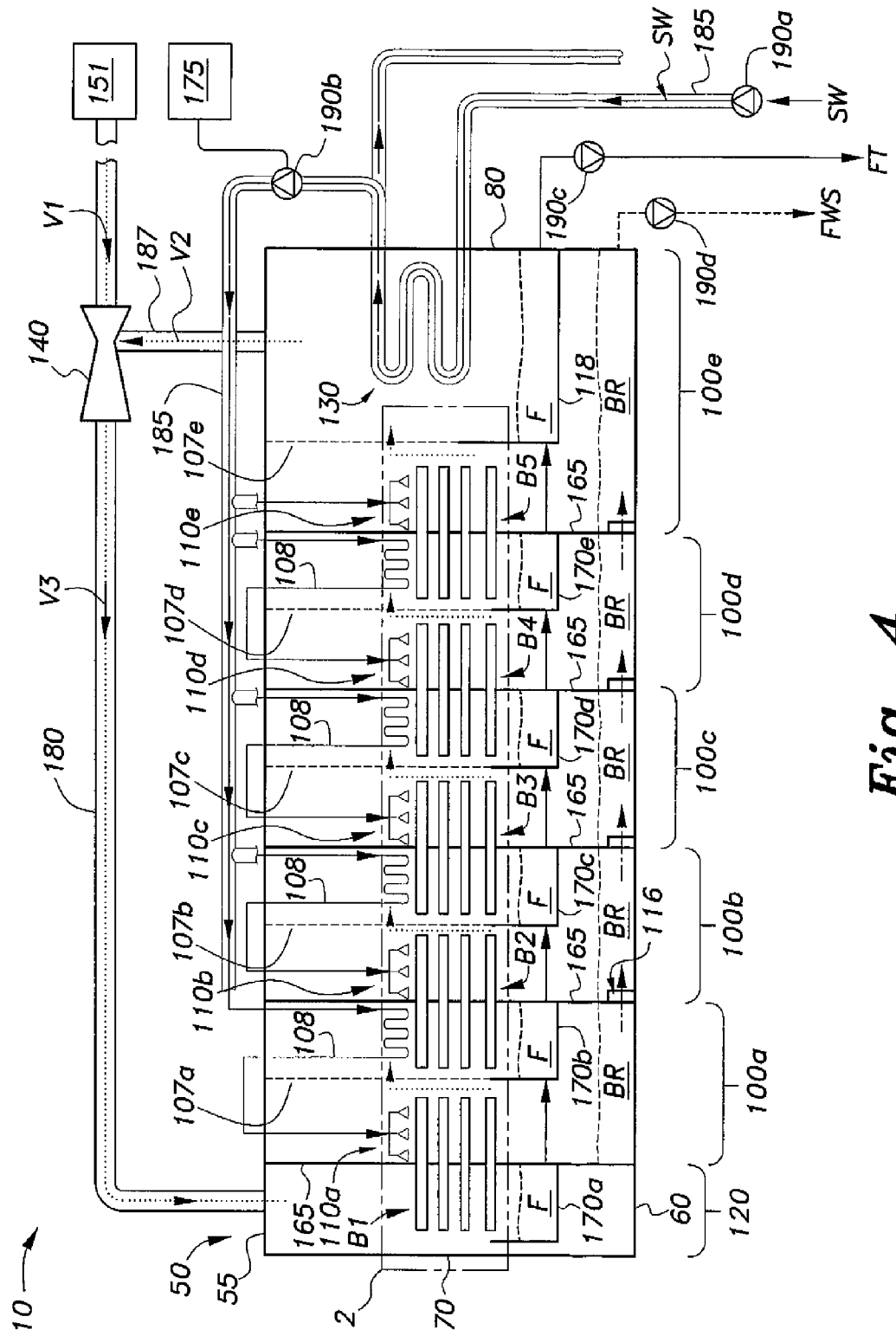
FIG. 4 is a schematic diagram of another embodiment of a desalination system having a plurality of effects according to the present invention.

It is to be noted that the feed water FW can be fed through the second tube 185 and into the plurality of sprayers by any suitable configuration. In one embodiment, for example, the sprayers 110a-110e can be arranged in series, as illustrated in FIG. 1, in which the feed water FW passes through each preheater tube 108 and corresponding sprayer, such as sprayers 110a-110e, successively. In another embodiment, the sprayers 110a-110e can be arranged in parallel, as illustrated in FIG. 4, in which the feed water FW passes through each preheater tube 108 and each corresponding sprayer, such as sprayers 110a-110e, at the same time.

Referring to FIGS. 3A-3H, a process by which feed water FW, such as seawater, is desalinated using the desalination system 10 is described. To start (Step 300) the desalination system 10, vapor V1 is pushed through the thermocompressor unit 140 and through the first tube 180 into the heating box 120 (Step 310). The vapor then comes in contact with the first ends 155 of the plurality of heat rods 150 in bundle B1 and heats the first ends 155 of the plurality of heat rods 150 in bundle B1 (Step 320). Any condensation that results from the heating of the first ends 155 of the plurality of heat rods 150 in bundle B1, as described in Step 320, can be collected as fresh water F by the first tray 170a and throttled to the second tray 170b, Feed water FW is drawn upward by the first pump 190 through the second tube 185 and through the condenser unit 130 (Step 330). After the feed water FW passes through the condenser unit 130, some of the feed water FW is pumped through the second tube 185 towards the first vessel 100a (Step 360) and a remaining portion of the feed water FW is released back into the feed water source FWS (Step 340), where the feed water FW can get drawn upward again through the second tube 185 to the condenser unit 130 (Step 360).

The feed water FW in the second tube 185 is discharged through the fifth spray 110e onto the second end 157 of the plurality of heat rods 150 in bundle B5 (Step 370). The feed water FW makes contact with the second ends 157 of the plurality of heat rods 150 in bundle B5 (Step 380), and a portion of the feed water FW collects at the bottom of the fifth vessel 100e (Step 390) as brine BR. The brine BR is then discharged into the feed water source FWS (Step 400).

Once the feed water FW makes contact with the second ends 157 of the plurality of heat rods 150 in bundle B5 as described in Step 380, a portion of the feed water FW evaporates and turns into steam (Step 410). The steam that is produced passes through the fifth demister 107e that separates the second ends 157 of the plurality of heat rods 150 in bundle B5 from the condenser unit 130, thereby causing water droplets to separate from the steam (Step 420). The water droplets then collect at the bottom of the fifth vessel 100e as fresh water F (Step 430).

Some of the steam in the fifth vessel 100c is drawn up as vapor V2 through the third tube 187 into the thermocompressor unit 140 to mix with the vapor V1 from the steam source 151 (Step 450) and the process continues as described in Step 310. The remaining steam in the fifth vessel 100e contacts the condenser unit 130, condenses on the tube bundle of the condenser unit 130, and is thereby converted into fresh water F (Step 460). The fresh water F collects in the fresh water tray 118 (Step 470). The fresh water F is then discharged into the fresh water tank FT (Step 480) and the process ends (Step 490).

A portion of the feed water FW in tube 185 is discharged through the sprayer 110e as described in Step 370, and a remaining portion of the feed water FW continues through the second tube 185 and is progressively fed into each of the adjacent vessels 100a-100d (Step 500). The feed water FW is preheated by the preheater tubes 108 of the fourth vessel 100d and is discharged through the fourth sprayer 110d, contacting the second ends 157 of the plurality of heat rods 150 in bundle B4. A portion of the feed water evaporates (Step 520) or transforms to steam which passes through the fourth demister 107d causing water droplets to separate from at least some of the steam (Step 530). After the water droplets separate from the steam, the water droplets collect in the tray 170e as fresh water (Step 540). The steam remaining in the fourth vessel 100d heats the first ends 155 of each of the plurality of heat rods 150 in bundle B5 (Step 550). The heat transfers to the second ends 157 of the plurality of heat rods 150 in the fifth bundle B5 (Step 560).

A portion of the feedwater in the second tube 185 is preheated by the preheater tubes 108 of the fourth vessel 100d and a remaining portion continues into the third vessel 100c. In the third vessel 100c, the feed water FW is preheated by the preheater tubes 108 and discharged through the third spray 110c (Step 580). When the feed water FW is discharged by the third spray 110c, it makes contact with the second ends 157 of the plurality of heat rods 150 in bundle B3 and a portion of the feed water evaporates and transforms into steam (Step 590). The steam passes through the third demister 107c causing water droplets to separate from at least some of the steam (Step 600). After the water droplets separate from the steam, the water droplets collect in tray 170d as fresh water F (Step 610). The steam remaining in the third vessel 100c heats the first ends 155 of the plurality of heat rods 150 in bundle B4 (Step 620).

The remaining feed water FW flowing through the second tube 185 continues through the second tube 185 and is preheated by the preheater tubes 108 in the second effect (Step 630). The feed water FW is discharged through the second spray 110b (Step 640) and makes contact with the second ends 157 of the plurality of heat rods 150 in bundle B2 (Step 650). The feed water FW evaporates and converts into steam upon contacting the second ends 157 of the plurality of heat rods 150 in bundle B2. The steam passes through the second demister 107b causing the water droplets to separate from the steam (Step 670). After the water droplets separate from the steam, the water droplets collects in the third tray 170c as fresh water F (Step 680). The steam that passes through the second demister 107b heats the first ends 155 of the plurality of heat rods 150 in bundle B3 (Step 690).

The remaining feed water FW flowing through the second tube 185 is preheated by preheaters 108 in the first vessel 100a as it is pumped into the first effect (Step 700). The feed water FW continues through the second tube 185 and is discharged by the first spray 110a (Step 710). Once the feed water FW is discharged by the first spray 110a, the feed water FW makes contact with the second ends 157 of the plurality of heat rods 150 in bundle B1 (Step 720). The spray evaporates upon contacting the second ends 157 of the plurality of heat rods 150 in bundle B1. The steam passes through the first demister 107a causing the water droplets to separate from the steam (Step 730). After the water droplets separate from the steam, the water droplets collect in tray 170b as fresh water F (Step 740). The steam that passes through the first demister 107a heats the first ends 155 of the plurality of heat rods 150 in bundle B2 (Step 750).

It is to be understood that the present invention is not limited to the embodiments described above, but encompasses any and all embodiments within the scope of the following claims.

We claim:

1. A desalination system, comprising:
a housing including a heating box, a condenser unit, a plurality of vessels, and a plurality of separator walls, each separator wall between adjacent vessels;
a first tubing;
a thermocompressor unit operatively connected to the heating box by the first tubing;
a plurality of demisters, each of the plurality of demisters being substantially vertically disposed in a respective one of the plurality of vessels;
a plurality of heat rods disposed horizontally in each vessel, each heat rod having a first end and a second end, the first end extending into one of the plurality of vessels and the second end extending into an adjacent one of the plurality of vessels;
wherein each of the plurality of heat rods extend through the separator wall between adjacent vessels;
a plurality of sprayers, each of the plurality of sprayers positioned in a respective one of the plurality of vessels;
a plurality of preheaters, each of the plurality of preheaters positioned in a respective one of the plurality of vessels;
at least one condensate tray disposed in each one of the plurality of vessels for receiving condensate;
a second tubing extending between a feed water source, the plurality of preheaters, and the plurality of sprayers; and
a plurality of pumps, each pump designed and configured for selectively moving fluid;
wherein the fluid is selectively moved through the second tubing, and from the at least one condensate tray.

2. The desalination system according to claim 1, further comprising a steam source.

3. The desalination system according to claim 1, further comprising a fresh water tray in communication with each one of the at least one condensate tray in each of the plurality of vessels for receiving fresh water.

4. A desalination system, comprising:
a heating box;
a condenser unit;
a plurality of vessels disposed between the heating box and the condenser unit wherein each vessel of the plurality of vessels consisting of:
a preheater;
a sprayer;
at least one condensate tray for receiving condensate;
a demister vertically disposed therein for separating water droplets from water vapor; and
a floor for collecting brine;
a plurality separator walls;
wherein the plurality of separator walls operatively disposed between the heating box, the plurality of vessels, and the condenser unit;
each one the separator walls between adjacent vessels and the condenser unit including an opening configured to allow brine to flow therethrough;
a plurality of heat rod groups, each heat rod group extending horizontally through one of a corresponding separator wall;
wherein a first end of each heat rod in each of the heat rod groups being disposed on one side of the separator wall, and a second end of each heat rod in each of the heat rod groups being disposed on an opposite side of the separator wall, such that each vessel has the first end of one of the heat rod groups and the seconds end of another one of the heat rod groups; and
wherein the heating box has the first end of the first heat rod group, and the condenser unit has the second end of the ultimate heat rod group;
whereby the preheater of each vessel receives heat the first end of the heat rod group and the sprayer of each vessel deposit feedwater onto the second end of the heat rod group, the second end of the heat rod group condensing freshwater into the condensate tray;
a fresh water tray in communication with each condensate tray of each vessel for receiving fresh water;
a first tubing;
a thermocompressor unit;
a steam source;
wherein the first tubing coupling the steam source to the thermocompressor, and the thermocompressor to the heating box;
a second tubing serially coupling the plurality of sprayers and preheaters of each vessel to a feedwater source;
a first pump for pumping feed water into the condenser unit;
a second pump for pumping feed water from the condenser unit into the second tubing;
a third pump for pumping freshwater from the freshwater tray; and
at least one other pump, the at least one other pump for pumping brine to the feedwater source.

5. A method for desalinating seawater, comprising the steps of:
providing a housing successively including a heating box, a plurality of vessels, and a condenser unit: a separator wall disposed between each of adjacent ones of the heating box, the plurality of vessels, and the condenser unit, each one of the plurality of vessels including a demister positioned vertically therein, a thermocompressor unit being connected to the heating box by a first tubing, a plurality of heat rods disposed horizontally between each of the adjacent heating box, plurality of vessels, and condenser unit, each heat rod having a first end on one side of one of the separator walls and a second end on the opposite side of the separator wall, a plurality of preheaters, each of the plurality of preheaters in a respective one of the plurality of vessels, a plurality of sprayers, each of the plurality of sprayers disposed in a respective one of the plurality of vessels, a second tubing extending between a feed water source, the plurality of preheaters, and the plurality of sprayers, and a plurality of pumps for selectively pumping feedwater, brine, and freshwater through the housing;
introducing a first vapor from a steam source into the first tubing and through the thermocompressor unit;
producing a second vapor in at least one of the plurality of vessels;
combining the first vapor and the second vapor to form a third vapor;

directing the third vapor into the heating box;
heating the first ends of the plurality of heat rods in the heating box;
discharging feed water from the feed water source onto the second ends of the plurality of heat rods in a first vessel of the plurality of vessels to create steam;
preheating the feed water prior to discharging the feed water onto the second ends of the plurality of heat rods;
separating water droplets from the steam produced in the first vessel using the demister in the first vessel;
heating the first ends of the plurality of heat rods in the first vessel by the steam;
discharging feed water from the feed water source onto the second ends of the plurality of heat rods in a second vessel of the plurality of vessels to create steam;
preheating the feed water prior to discharging the feed water onto the second ends of the plurality of heat rods;
separating water droplets from the steam produced in the second vessel using the demister in the second vessel;
condensing the steam produced in the second vessel of the plurality of vessels on the condenser unit; and
collecting fresh water.

6. The method for desalinating seawater according to claim 5, wherein feed water is discharged from the feed water source onto the second ends of the plurality of heat rods in the first vessel before feed water is discharged from the feed water source onto the second ends of the plurality of heat rods in the second vessel.

7. The method for desalinating seawater according to claim 5, wherein feed water is simultaneously discharged from the feed water source onto the second ends of the plurality of heat rods in the first vessel and the second vessel.

* * * * *